United States Patent
Morris (10) Patent No.: US 10,498,817 B1
(45) Date of Patent: Dec. 3, 2019

(54) PERFORMANCE TUNING IN DISTRIBUTED COMPUTING SYSTEMS

(71) Applicant: AMAZON TECHNOLOGIES, INC., Seattle, WA (US)

(72) Inventor: Dave John Morris, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 22 days.

(21) Appl. No.: 15/464,780

(22) Filed: Mar. 21, 2017

(51) Int. Cl.
*H04L 29/08* (2006.01)
*H04L 12/26* (2006.01)

(52) U.S. Cl.
CPC ........ *H04L 67/1097* (2013.01); *H04L 43/106* (2013.01); *H04L 67/306* (2013.01)

(58) Field of Classification Search
CPC .. H04L 67/1097; H04L 43/106; H04L 67/306
USPC .......................................................... 709/223
See application file for complete search history.

(56) References Cited

U.S. PATENT DOCUMENTS

| | | | | |
|---|---|---|---|---|
| 7,913,194 B1* | 3/2011 | Baylor | ................. | G06F 17/505 716/122 |
| 8,260,840 B1* | 9/2012 | Sirota | ................. | G06F 9/5061 370/216 |
| 8,296,419 B1* | 10/2012 | Khanna | ................. | G06F 9/5072 709/201 |
| 8,321,558 B1* | 11/2012 | Sirota | ................. | G06F 9/5011 709/224 |
| 8,418,181 B1* | 4/2013 | Sirota | ................. | H04L 67/00 709/201 |
| 8,706,798 B1* | 4/2014 | Suchter | ................. | G06F 9/5038 709/202 |
| 8,719,415 B1* | 5/2014 | Sirota | ................. | G06F 9/5061 709/221 |
| 8,732,118 B1* | 5/2014 | Cole | ................. | G06F 17/30563 707/600 |
| 8,819,106 B1* | 8/2014 | Sirota | ................. | G06F 9/485 709/201 |
| 8,938,416 B1* | 1/2015 | Cole | ................. | G06F 17/30592 707/607 |
| 2007/0294681 A1* | 12/2007 | Tuck | ................. | G06F 11/3404 717/149 |

(Continued)

OTHER PUBLICATIONS

EJ Technologies; JProfilier Manual; 2017 https://resources.ej-technologies.com/jprofiler/help/doc/help.pdf, 307 pages.

*Primary Examiner* — Nicholas R Taylor
*Assistant Examiner* — Chong G Kim
(74) *Attorney, Agent, or Firm* — Lowenstein Sandler LLP (57) ABSTRACT

A method of profiling distributed computing jobs may include receiving, by a profiling orchestrator service, a profiling request initiated by a profiling client. The profiling request may identify a master node and a target application to be executed by the master node and a plurality of worker nodes. The method may further include transmitting, to a worker node of the plurality of worker nodes, a profiling command identifying a parameter reflecting execution of the target application on the worker node. The method may further include receiving profiling data comprising an execution marker associated with execution of the target application on the worker node. The method may further include forwarding the profiling data to the profiling client.

15 Claims, 7 Drawing Sheets

(56) References Cited

U.S. PATENT DOCUMENTS

| | | | | |
|---|---|---|---|---|
| 2008/0244531 A1* | 10/2008 | Schmelter | ........... | G06F 11/3636 |
| | | | | 717/128 |
| 2009/0150874 A1* | 6/2009 | Chung | .................. | G06F 8/4441 |
| | | | | 717/151 |
| 2009/0204789 A1* | 8/2009 | Gooding | ............... | G06F 9/5066 |
| | | | | 712/28 |
| 2010/0153955 A1* | 6/2010 | Sirota | ..................... | G06F 9/485 |
| | | | | 718/102 |
| 2011/0138366 A1* | 6/2011 | Wintergerst | ........ | G06F 11/3409 |
| | | | | 717/130 |
| 2011/0314453 A1* | 12/2011 | Tebeka | ................ | G06F 11/3404 |
| | | | | 717/130 |
| 2013/0091094 A1* | 4/2013 | Nelke | ............... | G06F 17/30315 |
| | | | | 707/610 |
| 2013/0254196 A1* | 9/2013 | Babu | ................. | G06F 17/30595 |
| | | | | 707/736 |
| 2014/0047342 A1* | 2/2014 | Breternitz | ............. | G06F 9/5061 |
| | | | | 715/735 |
| 2014/0067992 A1* | 3/2014 | Saeki | ................ | H04L 29/08549 |
| | | | | 709/214 |
| 2014/0372611 A1* | 12/2014 | Matsuda | ................. | H04L 45/12 |
| | | | | 709/225 |
| 2015/0012629 A1* | 1/2015 | Verma | ................. | G06F 11/3428 |
| | | | | 709/223 |
| 2015/0379078 A1* | 12/2015 | Welton | ............. | G06F 17/30463 |
| | | | | 707/718 |
| 2017/0024305 A1* | 1/2017 | Betser | ................. | G06F 11/3612 |
| 2017/0031793 A1* | 2/2017 | Thomas | ............. | G06F 17/5009 |
| 2017/0060635 A1* | 3/2017 | Wu | ....................... | G06F 9/5011 |
| 2017/0270024 A1* | 9/2017 | Nicol | .................. | G06F 11/3612 |

* cited by examiner

PERFORMANCE TUNING IN DISTRIBUTED COMPUTING SYSTEMS

BACKGROUND

Cloud computing defines a model for enabling ubiquitous, convenient, on-demand network access to a shared pool of configurable computing resources (e.g., networks, servers, storage, applications, and services) that can be rapidly provisioned and released with minimal management effort or service provider interaction. Essential characteristics of the cloud computing model include on demand self-service, broad network access, resource pooling, rapid elasticity, and measured service. The cloud computing model includes several service models, including Software as a Service (SaaS), Platform as a Service (PaaS), and Infrastructure as a Service (IaaS). The cloud computing model may be implemented according to one of the several deployment models, including private cloud, community cloud, public cloud, and hybrid cloud.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding only.

DETAILED DESCRIPTION

Described herein are systems and methods for profiling distributed computing jobs.

Distributed computing systems may perform computations in a coordinated manner by multiple compute nodes. Examples of distributed computing systems include massive parallel processing (MPP) clusters and computing grids of various architectural models.

In various embodiments, distributed computing systems may be represented by "shared nothing" architecture, "shared everything" architecture, shared disk architecture, or other architectural models. In one embodiment, a distributed computing system may follow the "shared nothing" architecture, in which none of the nodes share memory or disk storage, and thus each node is independent from other nodes and self-sufficient, and there is no single point of contention across the system. In one embodiment, a distributed computing system may follow the "shared everything" architecture, in which the nodes within a cluster share the memory, processors, and/or storage resources, and thus enable high availability implementations. In one embodiment, a distributed computing system may follow the "shared disk" architecture, in which shared disks are accessible by all the nodes of a cluster and every processor has local memory, thus eliminating the possible memory bottlenecks while providing a certain degree of fault tolerance implemented by the shared disks.

Various performance tuning techniques rely upon code execution profiling which may be facilitated by profiling tools. Such tools usually present the profiling data in the context of an individual application being executed on a single node. In order to profile an application running on a distributed computing system, profiling agents may be installed on multiple individual worker nodes. Profiling an application may involve identifying a subset of worker nodes to be profiled, identifying worker node states in which the profiling should be performed, retrieving the profiling data from each worker node, aggregating the profiling data retrieved from multiple nodes, and forwarding the aggregated profiling data to a node running the profiling tool, which would process and present the profiling data to the user.

However, the distributed nature of a computing system may involve multiple traffic flows between master and worker nodes across multiple networks which may have their respective routing and filtering rules, and thus may impede performance tuning efforts utilizing code profiling techniques that rely upon local profiling agents running on multiple worker nodes. Establishing simultaneous network connections from the profiling client to the multiple worker nodes may not be practical if the number of worker nodes is large, since the number of simultaneous connections is limited by the number of network sockets on the connection-originating host (i.e., the profiling client). Furthermore, in order to satisfy security requirements, such connections may need to be cryptographically protected, which may rapidly exhaust the limited processing resources of the profiling client.

The systems and methods of the present disclosure overcome the above-noted and other deficiencies of common performance tuning methods by providing a distributed performance tuning architecture including a profiling orchestrator service in communication with profiling agents that are running on the master and worker nodes. The profiling orchestrator service may coordinate the profiling activities performed by the local agents, which may involve sending commands to the local agents to start or stop profiling activities with respect to identified target applications and retrieving the collected profiling data from the local agents. A local agent may collect the specified profiling data from the local execution environment (e.g., the Java Virtual Machine (JVM)) and forward the collected profiling data to the profiling orchestrator service, which may aggregate and forward the profiling data to a profiling client. The profiling client may be equipped with a graphical user interface (GUI) employed for representing the collected profiling data to the end user.

Therefore, the systems and methods described implement a scalable performance tuning architecture for deployment in distributed computing environments. The systems and methods described herein may be implemented by hardware (e.g., general purpose or specialized processing devices, or other devices and associated circuitry), software (e.g., instructions executable by a processing device), or a combination thereof. Various aspects of the above referenced methods and systems are described in details herein below by way of example, rather than by way of limitation.

Figure 1:
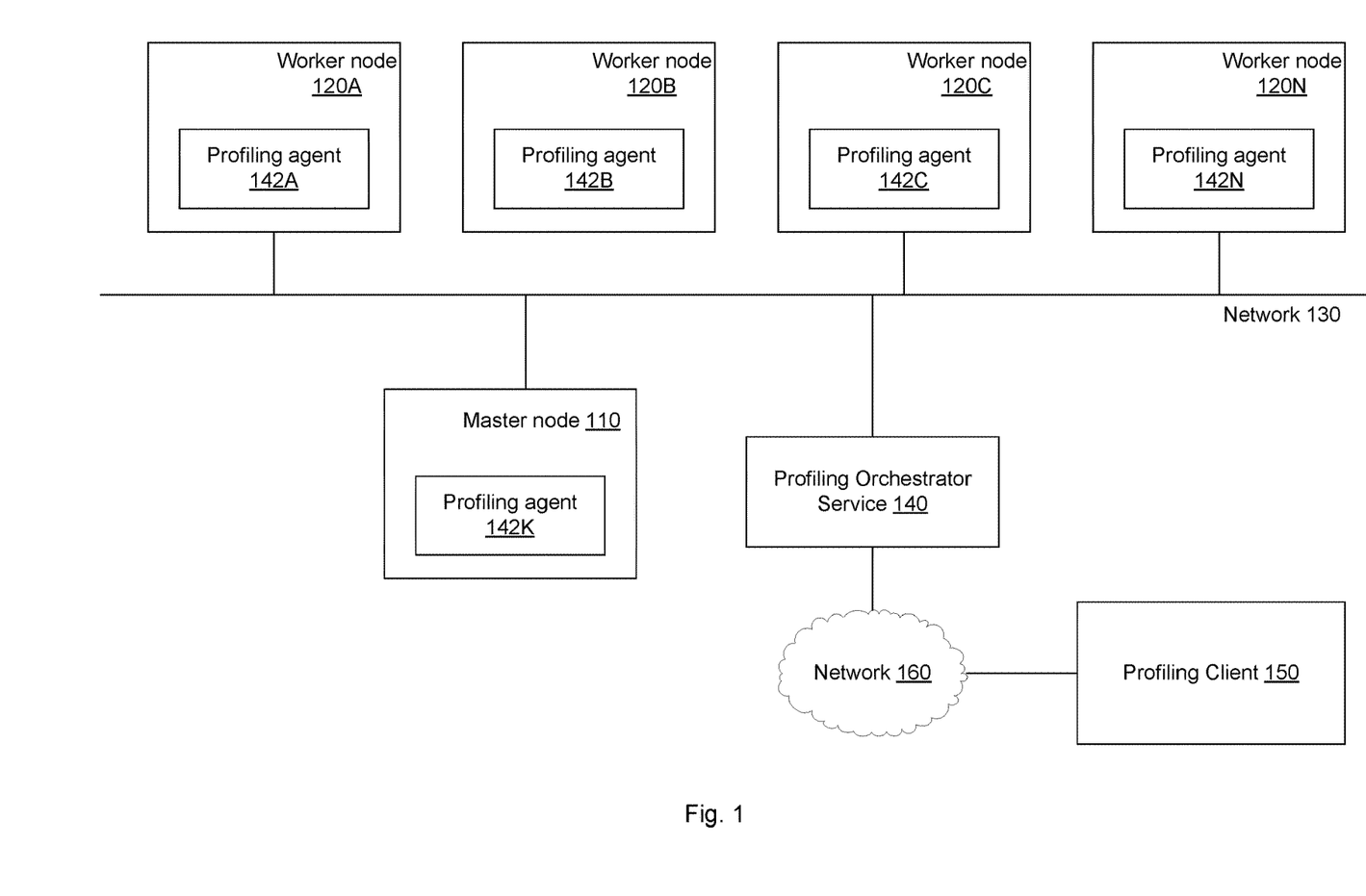
FIG. 1 schematically illustrates one embodiment of a performance tuning architecture deployed in a distributed computing system.

FIG. 1 schematically illustrates one embodiment of a performance tuning architecture deployed in a distributed computing system. As schematically illustrated by FIG. 1, a distributed computing system 100 may include a master node 110 which may communicate with multiple worker nodes 120A-120N over one or more networks 130, including one or more virtual networks, one or more local area networks, one or more wide area networks, or any combination thereof.

In one embodiment, the master node 110 and worker nodes 120A-120N may implement a framework for distributed storage and processing of big data sets using the MapReduce programming model, e.g., a Hadoop framework. The core of the distributed storage and processing framework may include a storage part implementing a distributed file system and a processing part implementing the MapReduce programming model. The framework may employ multiple processing nodes for parallel processing of the data distributed across multiple storage nodes. In one embodiment, the framework may implement the data locality principle, in accordance with which a processing node is directed to process the data residing on one or more of the storage nodes that are local to or reside in close network proximity of the processing node.

In one embodiment, the distributed computing system 100 may implement a MapReduce engine including a job tracker accepting MapReduce jobs from client applications. The job tracker may push work out to available task tracker nodes, attempting to keep the work as close to the data as possible. If a task tracker fails or times out, the associated part of the job may be rescheduled. The task tracker running on each processing node may spawn a separate execution environment (e.g., a JVM process) to prevent the task tracker itself from failing if the running job crashes its JVM. The framework may implement a scheduling policy (e.g., a first in—first out (FIFO) scheduling), and may support a certain number of scheduling priorities to schedule jobs from a work queue.

In one embodiment, the distributed computing system 100 may further include a profiling orchestrator service 140 which may be employed for coordinating profiling agents 142A-142K that are running on the master node 110 and worker nodes 120A-120N. In one embodiment, the profiling orchestrator service 140 may be deployed within a separate execution environment (e.g., on a dedicated virtual machine or physical server) which is interconnected with master node 110 and worker nodes 120A-120N by physical and/or virtual networks that implement respective network paths which provide unimpeded flow of traffic carrying the profiling commands and profiling data between the profiling orchestrator service and the nodes 110, 120A-120N. Alternatively, the profiling orchestrator service 140 may be deployed within an execution environment which is collocated with master node.

The profiling orchestrator service 140 may coordinate the profiling activities performed by the profiling agents 142A-142N. In one embodiment, the profiling orchestrator service 140 may receive, via a public network (e.g., the Internet) 160, a profiling request initiated by a profiling client 150. The profiling request may identify the target application to be monitored (e.g., a MapReduce job) and the master node 110 that coordinates execution the target application. The profiling request may further specify the values of one or more profiling parameters, e.g., profiling start and stop times, sampling interval, types of profiling data to be retrieved, and/or other parameters of the profiling session.

Responsive to receiving the profiling request, the profiling orchestrator service 140 may communicate to the master profiling agent 142A running on the master node 110. In one embodiment, the profiling orchestrator service 140 may establish a Transmission Control Protocol (TCP) connection to a pre-defined TCP port of the master node 110 identified by the profiling request. Responsive to establishing the connection, the profiling orchestrator service 140 may query the master profiling agent 142A for a list of worker nodes 120 that are employed for executing the target application and for network connection parameters of their respective local profiling agents 142. Alternatively, the profiling orchestrator service 140 may scan the available networks to discover local profiling agents 142 (e.g., listening on a pre-defined TCP port). Alternatively, each local profiling agent 142 may, upon start-up, register with the profiling orchestrator service or other centralized registry service, by transmitting a message identifying the node on which the profiling agent operates and network connection parameters (e.g., the network address and TCP port) on which the profiling agent is accepting incoming connections from the profiling orchestrator service 140.

The profiling orchestrator service 140 may then open network connections (e.g., TCP connections) to the profiling agents 142. Once established, the connections may be kept alive for the duration of the profiling session may be utilized by the profiling orchestrator service 140 for transmitting profiling commands and receiving profiling data collected by profiling agents 142.

In one embodiment, the profiling orchestrator service 140 may send, to profiling agents 142, point-to-point commands to cause local profiling agents running on the master node 110 and worker nodes 120 to start or stop profiling of the target application. In one embodiment, the profiling orchestrator service 140 may send, to a local profiling agent 142, a message instructing the local profiling agent to start profiling a certain application responsive to detecting a certain triggering event. The message may identify the target application, e.g., by the executable identifier, the process identifier, or the thread identifier. The message may further identify the triggering event for initiating profiling of the identified target application. The message may further identify the sampling interval, the profiling data to be collected, and/or other parameters of the profiling session. The profiling data may include the CPU utilization data, memory utilization data, the stack trace including the identifiers of methods being executed, and/or data returned by custom callback monitor installed in the local execution environment of the master node 110 or worker node 120.

In one embodiment, the triggering event may be represented by a real-time clock value at which the local profiling agent should start collecting the profiling data. In one embodiment, the triggering event may be represented by a value of a specified parameter of the local execution environment of the master node 110 or worker node 120 (e.g., the CPU load exceeding a certain threshold). In one embodiment, the triggering event may be represented by an identifier of a method to appear at the stack trace of the local execution environment of the master node 110 or worker node 120. In one embodiment, the triggering event may be represented by a value of a specified parameter of a custom callback monitor installed in the local execution environment of the master node 110 or worker node 120 (e.g., a transaction identifier returned by the custom callback monitor).

In one embodiment, the master node 110 may, in course of executing the target application, create new worker nodes 120. The profile orchestrator service may periodically poll the master node 110 for states of existing worker nodes and/or identifiers of newly created worker nodes employed to execute the target application and for network connection parameters of their respective local profiling agents 142.

Responsive to having been triggered by a start profiling command issued by the profiling orchestrator service 140, a local profiling agent 142 may collect the specified profiling data from the local execution environment and forward the collected profiling data to the profiling orchestrator service 140. Local execution environments of the worker nodes 120A-120N may include Java, .NET, Python, Ruby and/or various other execution environments. Each local profiling agent 142 may install various profiling callbacks to the execution environment running on the respective worker node 120 in order to receive profiling data.

In one embodiment, a local profiling agent 142 may support event-based profiling, which is triggered by one or more pre-defined software events or performance monitor events occurring within the local execution environment of a respective worker node 120. In one embodiment, a local profiling agent 142 may support statistical profiling, which involves taking samples of values of certain parameters at regular intervals while the target application is executing.

In one embodiment, for installing the profiling callbacks a local profiling agent 142 may utilize JVM Tools Interface (JVMTI) exposed by a Java-based local execution environment. In one embodiment, a local profiling agent 142 may implement a COM server to connect to Common Language Runtime (CLR) of a .NET-based local execution environment. In one embodiment, a local profiling agent 142 may utilize profiling modules supported by Python or Ruby local execution environments.

In one embodiment, the profiling data collected by the local profiling agent 142 via the profiling callbacks may include, for each processing thread running within the local execution environment of the worker node 120, respective CPU utilization data, memory utilization data, the stack trace including the identifiers of methods being executed, a number of I/O requests within a specified period of time, and/or other profiling parameters. In one embodiment, a local profiling agent 142 may perform code instrumentation, i.e., alter the code being executed by the local execution environment in order to install, into the local execution environment running on the respective worker node, one or more custom callbacks, as described in more detail herein below with reference to FIG. 3.

In one embodiment, a local profiling agent 142 may locally buffer the collected profiling data. The profiling agent may insert, into the collected profiling data, execution markers reflecting execution of the target application by the worker node. In one embodiment, an execution marker associated with one or more profiling data items may be represented by a timestamp reflecting the value of the real time clock identifying the time of collecting the associated profiling data items. In one embodiment, an execution marker associated with one or more profiling data items may be represented by a thread identifier referencing a processing thread to which the associated profiling data items pertain. In one embodiment, an execution marker associated with one or more profiling data items may be represented by a transaction identifier that has been generated by a custom callback monitor installed in the local execution environment of the master node 110 or worker node 120.

In one embodiment, the local profiling agent 142 may stream the collected profiling data items and associated execution markers back to the profiling orchestrator service 140 over the network connection that has been initiated by the profiling orchestrator service 140 at the start of the profiling session. In one embodiment, the local profiling agent 142 may stream the collected profiling data to the profiling orchestrator service 140 periodically, upon expiration of a certain time interval. In one embodiment, the local profiling agent 142 may stream the collected profiling data to the profiling orchestrator service 140 responsive to determining that the amount of collected profiling data exceeds a certain threshold value. In one embodiment, the local profiling agent 142 may stream the collected profiling data to the profiling orchestrator service 140 responsive to evaluating a condition specified by the profiling request.

In one embodiment, the profiling orchestrator service 140 may aggregate and forward the profiling data received from multiple local profiling agents 142 to the profiling client 150. Aggregating the profiling data may include correlating the profiling data items received from two or more local profiling agents 142 based on the associated execution markers. In one embodiment, the profiling orchestrator service 140 may aggregate two or more profiling data items having identical timestamps and received from two or more local profiling agents 142. In one embodiment, the profiling orchestrator service 140 may aggregate two or more profiling data items having identical transaction identifiers and received from two or more local profiling agents 142. Aggregating the profiling data may involve formatting the profiling data into a plurality of records of a pre-defined data structure. The data structure may be indexed by the node identifier, execution thread identifier, timestamp, transaction identifier and/or other identifiers associated with the profiling data items retrieved from local profiling agents.

In one embodiment, the profiling client 150 may be equipped with a GUI employed for representing the collected profiling data to the end user. In one embodiment, the profiling client 150 may generate various views of the received profiling data in real time and/or save the received profiling data to a local storage.

Figure 2:
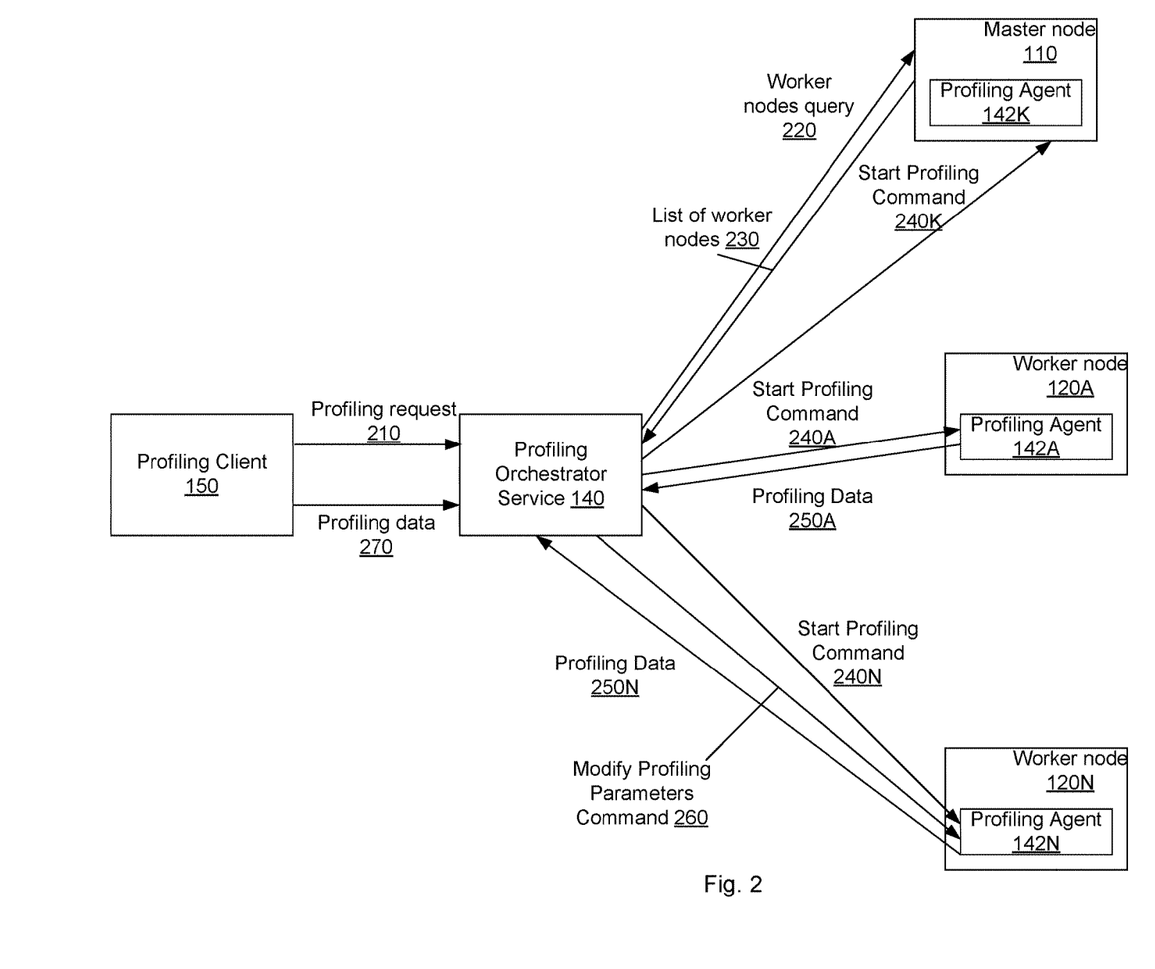
FIG. 2 schematically illustrates one embodiment of command and data flows between the components of the distributed performance tuning system.

FIG. 2 schematically illustrates one embodiment of command and data flows between the components of the distributed performance tuning system. As schematically illustrated by FIG. 2, the profiling orchestrator service 140 may receive a profiling request 210 from a profiling client 150. The profiling request 210 may identify the target application to be monitored and the master node 110 that executes the target application. The profiling request 210 may further specify the values of one or more profiling parameters, e.g., profiling start and stop times, sampling interval, profiling data to be retrieved, and/or other parameters of the profiling session.

Responsive to receiving the profiling request 210, the profiling orchestrator service 140 may query (message 220) the master profiling agent 142A for a list of worker nodes 120 that are employed for executing the target application and for network connection parameters of their respective local profiling agents 142. Responsive to receiving a response 230 identifying the worker nodes 120A-120N, the profiling orchestrator service 140 may transmit, to each of the profiling agents 142A-142K residing on the identified worker nodes 120A-120N, a start profiling command 240A-240K to cause the respective profiling agent 142 to start profiling of the target application. The start profiling command 240 may identify the target application, e.g., by the executable identifier, the process identifier, or the thread identifier. The start profiling command 240 may instruct the profiling agent to start profiling responsive to detecting a certain triggering event. The start profiling command 240 may further identify the sampling interval, the profiling data to be collected, and/or other parameters of the profiling session.

In one embodiment, the master node 110 may, in course of executing the target application being profiled, create new worker nodes 120. The profile orchestrator service 140 may periodically poll (message 220) the master node 110 for identifiers of newly created worker nodes employed to perform the target application and for network connection parameters of their respective local profiling agents 142. Responsive to discovering a new worker node 120M, the profile orchestrator service 140 may transmit a start profiling command 240M to the profiling agent 142M of the newly discovered worker node 120M.

Responsive to having been triggered by the start profiling command 240, a profiling agent 142 may collect the specified profiling data from the local execution environment and buffer the collected profiling data in the local storage. In one embodiment, the local profiling agent 142 may stream (message 250) the collected profiling data items and associated execution markers back to the profiling orchestrator service 140 over the network connection that has been initiated by the profiling orchestrator service 140 at the start of the profiling session. In various embodiments, the local profiling agent 142 may stream the collected profiling data to the profiling orchestrator service 140 periodically, responsive to determining that the amount of collected profiling data exceeds a certain threshold value, or responsive to evaluating a condition specified by the profiling request.

In course of the profiling session, the profiling orchestrator service 140 may transmit, to one or more worker nodes 120, profiling commands (260) modifying the profiling session parameters (e.g., the sampling interval, the profiling data to be collected, and/or other profiling session parameters).

The profiling orchestrator service 140 may aggregate and forward (message 270) the profiling data received from multiple local profiling agents 142 to the profiling client 150. Aggregating the profiling data may include correlating the profiling data items received from two or more local profiling agents 142 based on the associated execution markers.

Figure 3:
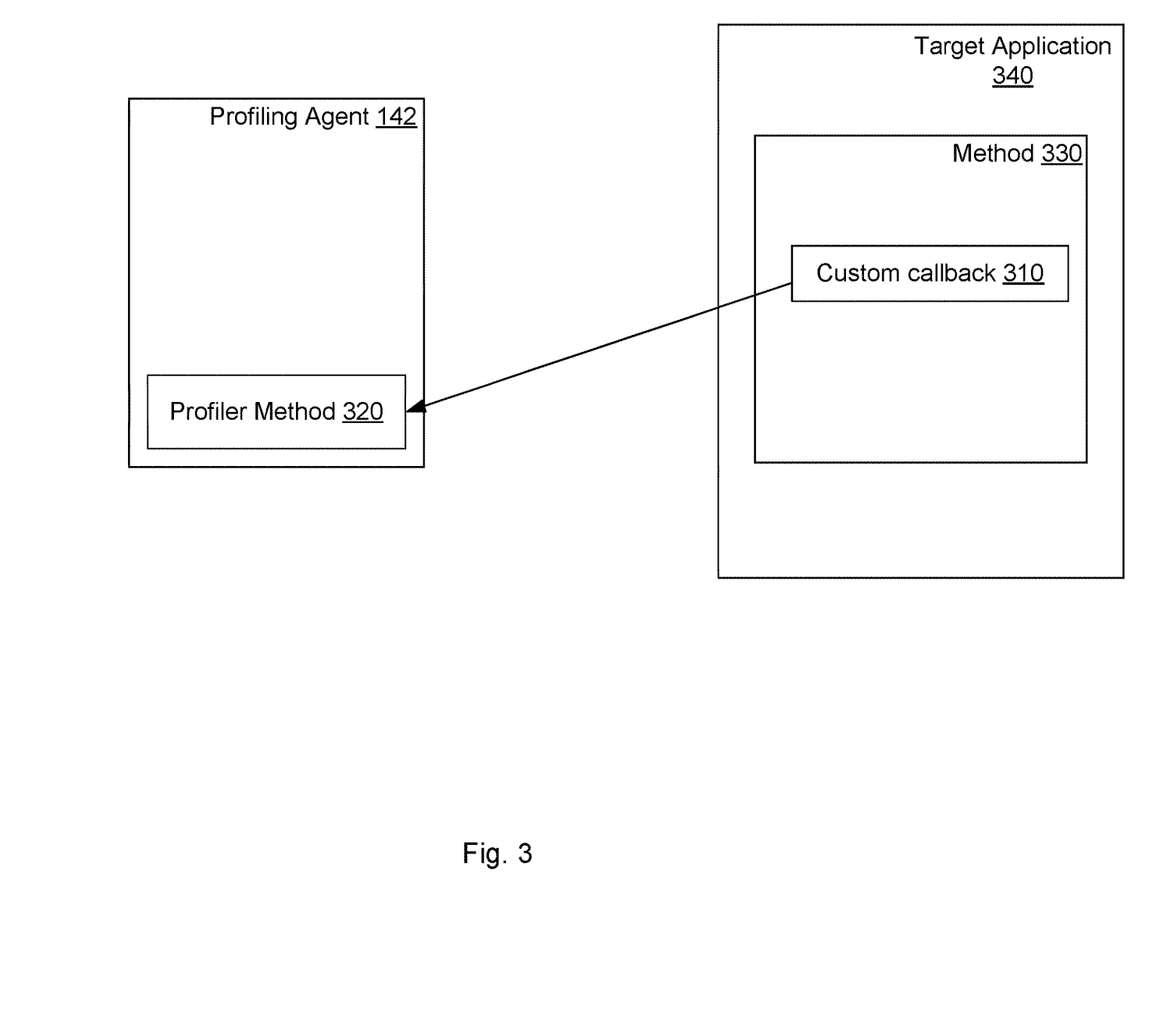
FIG. 3 schematically illustrates operation of an example embodiment of a custom callback monitor installed by a profiling agent into the target application.

FIG. 3 schematically illustrates operation of an example embodiment of a custom callback monitor installed by a profiling agent 142 into the target application. As noted herein above, in order to install a custom callback monitor, a local profiling agent 142 may perform code instrumentation, i.e., alter the code being executed by the local execution environment of the associated master node 110 or worker node 120. In one embodiment, the local profiling agent 142 may install a custom callback 310 to invoke a certain profiler method 320 at an entry or exit of a specified method 330 of the target application 340. The profiler method invocation may be conditional, i.e., may be performed responsive to evaluating a specified condition (e.g., the CPU load exceeding a certain threshold).

In one embodiment, the local profiling agent 142 may perform static instrumentation of the code in order to install the custom callback monitors, which involves modifying one or more class files before they are loaded into the execution environment (e.g., a JVM). In one embodiment, the local profiling agent 142 may perform load-time instrumentation of the code in order to install the custom callback monitors, which involves modifying the code when it is being loaded by the execution environment (e.g., by intercepting the ClassFileLoad event generated by the JVM or functionally similar events generated by other execution environment). In one embodiment, the local profiling agent 142 may perform dynamic instrumentation of the code in order to install the custom callback monitors, which involves modifying the code at runtime, after it has been loaded by the execution environment (e.g., by intercepting the ClassFileLoad event generated by the JVM or functionally similar events generated by other execution environment). The latter mechanism allows instrumentation which may be modified in the course of code execution. In one embodiment, the local profiling agent may utilize dynamic instrumentation in response to receiving, from the profiling orchestration service, a profiling command modifying the profiling session parameters (e.g., the types of profiling data to be collected).

In one embodiment, a custom callback installed by the local profiling agent may be invoked by certain data processing methods and may return the current execution thread identifier, the current stack trace, the current heap state, the current memory map, the current I/O request rate, and/or various other code execution parameters.

In one embodiment, a custom callback installed by the local profiling agent may be invoked by certain data processing methods and may return an identifier of a portion of the data that is currently being processed by the method (e.g., pre-defined bytes of the portion of the data, a hash value of the portion of the data, etc.). The returned value may be interpreted by the profiling orchestrator service 140 as a transaction identifier or as an execution marker reflecting the progress of a certain data item through the distributed processing scheme.

Figure 4:
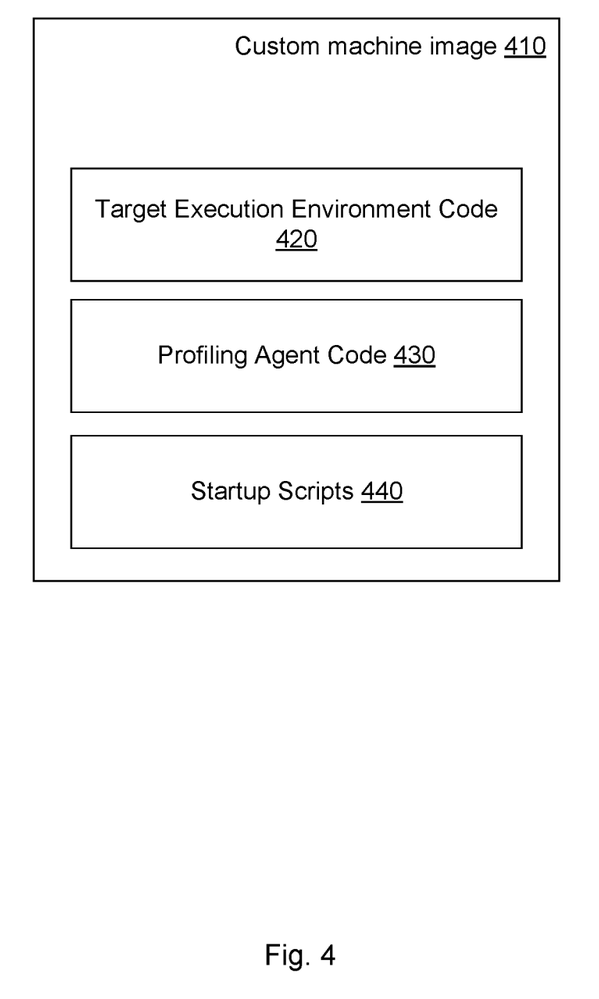
FIG. 4 schematically illustrates one embodiment of custom machine image that may be employed for provisioning a worker node.

FIG. 4 schematically illustrates one embodiment of custom machine image 410 that may be employed for provisioning the operating environment of a master node 110 or a worker node 120. The custom machine image 410 may include one or more code modules 420 for implementing the target execution environment (e.g., a JVM), one or more code modules 430 for implementing the local profiling agent, and one or more start-up scripts 440 to initiate execution of the target execution environment and the local profiling agent. Initialization parameters of the local profiling agent may include an identifier of a TCP port on which the profiling agent should start listening upon being initialized. The startup scripts 440 may initialize the target execution environment with a profiling mode enabled and/or may supply various initialization parameter values for the target execution environment.

Figure 5:
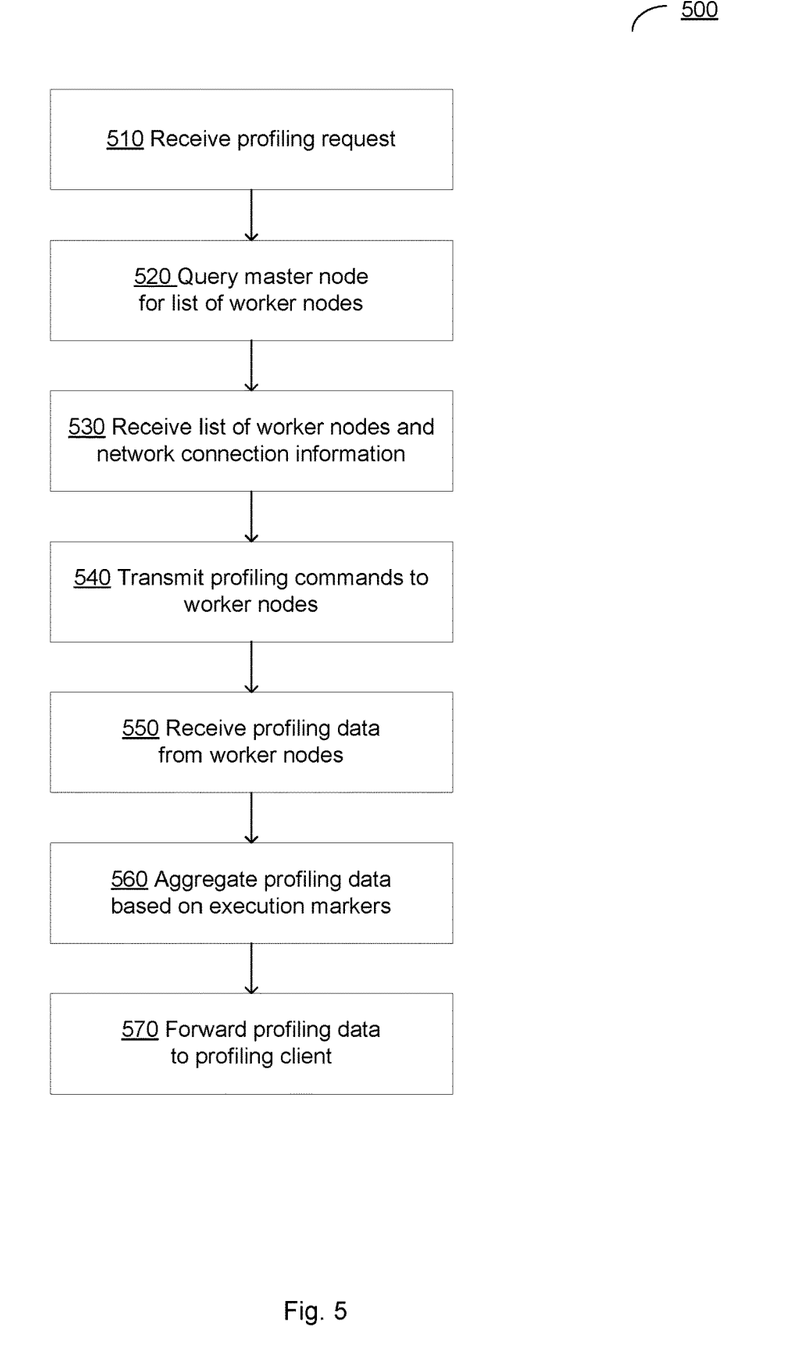
FIG. 5 is a flow diagram of one embodiment of a method of profiling distributed computing jobs by a profiling orchestrator service.

FIG. 5 is a flow diagram of one embodiment of a method of profiling distributed computing jobs performed by the profiling orchestrator service. Method 500 may be performed by processing logic that includes hardware (e.g., circuitry, dedicated logic, programmable logic, microcode, etc.), software (e.g., instructions run on a processor to perform hardware simulation), or a combination thereof. Method 500 or each of its individual functions, routines, subroutines, or operations may be performed by one or more processors of a computer system (e.g., the computing device 700 of FIG. 7) implementing the method. In one embodiment, method 500 may be performed by a single processing thread. Alternatively, method 500 may be performed by two or more processing threads, each thread implementing one or more individual functions, routines, subroutines, or operations of the method. In one embodiment, he processing threads implementing method 500 may be synchronized (e.g., using semaphores, critical sections, or other thread synchronization mechanisms). Alternatively, the processing threads implementing method 500 may be executed asynchronously with respect to each other. Therefore, while FIG. 5 and the associated description lists the operations of method 500 in certain order, various embodiments of the method may perform at least some of the described operations in parallel or in arbitrary selected orders.

Referring to FIG. 5, at block 510, a processing device implementing the method may receive, by a profiling orchestrator service, a profiling request initiated by a profiling client. The profiling request may identify a master node and a target application to be executed by the master node in collaboration with a plurality of worker nodes.

At block 520, the processing device may query the master node for a list of worker nodes that are employed for executing the target application.

At block 530, the processing device may receive, from the master node, the list of worker nodes employed for executing the target application and the network connection parameters of their respective local profiling agents.

At block 540, the processing device may transmit a profiling command to each worker node of the worker nodes identified by the list. The profiling command may identify a parameter reflecting execution of the target application on the worker node. In one embodiment, the parameter may be represented by a time parameter identifying a real-time clock value at which the profiling should be started. In one embodiment, the parameter may be represented by an identifier of an execution thread of the target application. In one embodiment, the parameter may be represented by an identifier of a transaction to be executed by the target application, as described in more detail herein above.

In one embodiment, the profiling command may identify a triggering event for initiating profiling of the target application. In one embodiment, the triggering event may be represented by a real-time clock value at which the local profiling agent should start collecting the profiling data. In one embodiment, the triggering event may be represented by a value of a specified parameter of the local execution environment (e.g., the CPU load exceeding a certain threshold). In one embodiment, the triggering event may be represented by an identifier of a method to appear at the stack trace of the local execution environment. In one embodiment, the triggering event may be represented by a value of a specified parameter of a custom callback monitor installed in the local execution environment.

At block 550, the processing device may receive profiling data from one or more worker nodes executing the target application. The profiling data may include one or more profiling data items associated with execution markers reflecting the execution of the target application on the worker node. A profiling data item may identify a processing thread running within the local execution environment of the worker node and may include the CPU utilization data, memory utilization data, the stack trace including the identifiers of methods being executed, the number of I/O requests within a specified period of time, and/or other code profiling parameters. In one embodiment, an execution marker associated with one or more profiling data items may be represented by a timestamp reflecting the value of the real time clock identifying the time of collecting the associated profiling data items. In one embodiment, an execution marker associated with one or more profiling data items may be represented by a thread identifier referencing a processing thread to which the associated profiling data items pertain. In one embodiment, an execution marker associated with one or more profiling data items may be represented by a transaction identifier that has been generated by a custom callback monitor installed in the local execution environment.

At block 560, the processing device may aggregate the profiling data based on the execution markers. In one embodiment, the processing device may correlate the profiling data items received from two or more local profiling agents based on the associated execution markers. In one embodiment, the processing device may aggregate two or more profiling data items having identical timestamps and received from two or more local profiling agents. In one embodiment, the professing device may aggregate two or more profiling data items having identical transaction identifiers and received from two or more local profiling agents.

At block 570, the processing device may forward the profiling data to the profiling client. Responsive to completing operations of block 570, the method may terminate.

Figure 6:
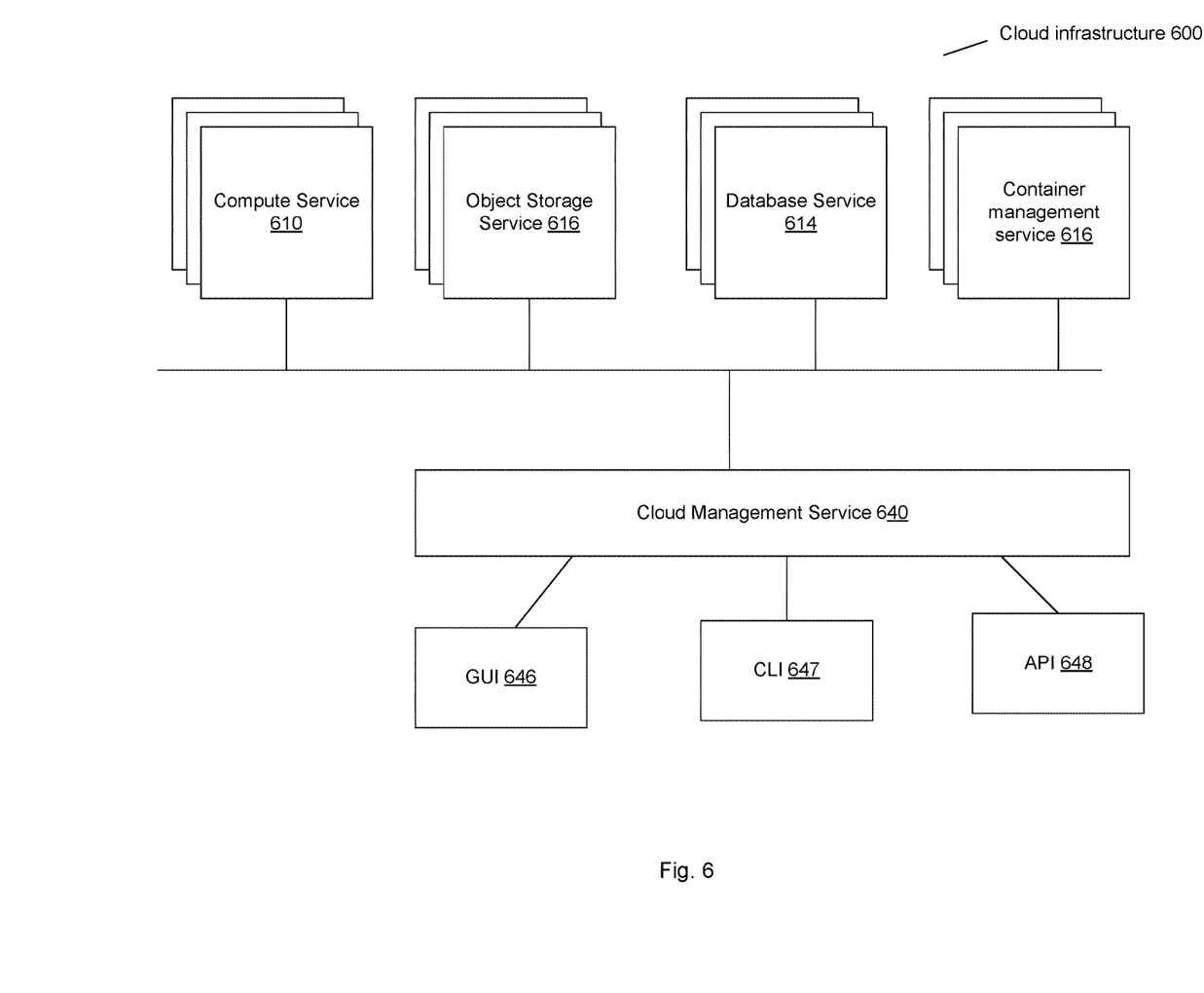
FIG. 6 schematically illustrates one embodiment of a cloud infrastructure that may be utilized for deploying machine learning-based models.

FIG. 6 schematically illustrates one embodiment of a cloud infrastructure that may be utilized for deploying scalable performance tuning system and methods described herein. As schematically illustrated by FIG. 6, the cloud infrastructure 600 may include a compute service 610, an object storage service 616, a database service 614, a container management service 616, as well as various other services that are omitted from FIG. 6 for clarity and conciseness. While FIG. 6 illustrates each of the above listed services running on a dedicated hardware server, in one embodiment, two or more services may be collocated on a single hardware server. Servers executing the above listed services may be interconnected by one or more networks 630, including one or more virtual networks, one or more local area networks, one or more wide area networks, or any combination thereof.

In one embodiment, the compute service 610 may provide scalable computing capacity, e.g., in the form of virtual machine instances or containers. The object storage service 616 may implement a scalable object storage system with a web service interface. The database service 614 may implement a relational database supporting structured query language (SQL) interface. The container management service 616 may manage containers running on compute instances. In one embodiment, the container management service 616 may export an application programming interface (API) for starting and stopping container-based applications, and performing various container-management tasks including scheduling container instances based on resource needs, security policies and availability requirements.

The above-referenced and other services provided by the cloud infrastructure 600 may have configurable high-availability, auto-scaling and other operational features. The above-referenced and other services may be managed by the cloud management service 640 which, among other functions, may perform resource provisioning and configuration. The cloud management service 640 may export a graphical user interface (GUI) 646, a command line interface (CLI) 647, and/or an application programming interface (API) 648.

Figure 7:
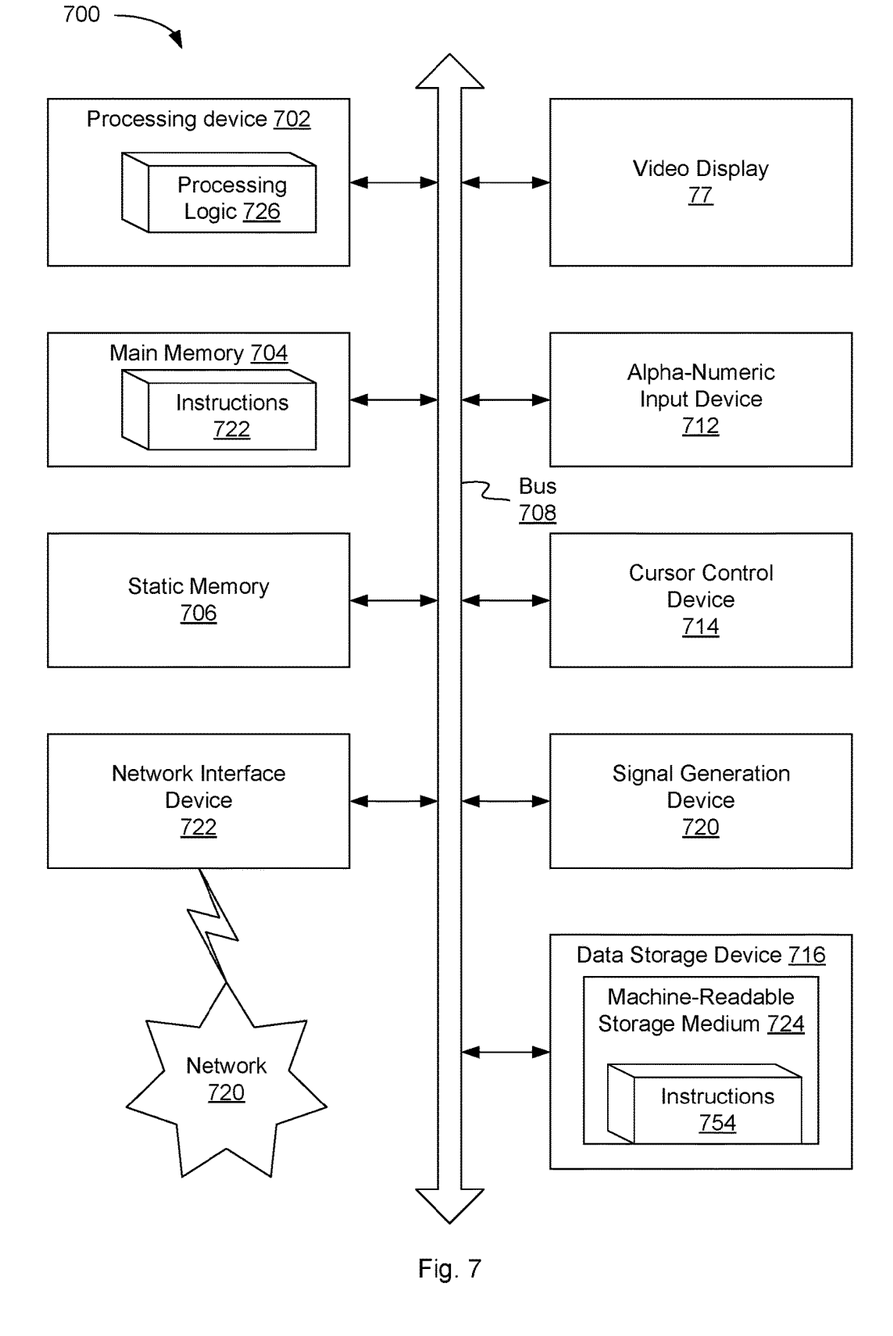
FIG. 7 illustrates a diagrammatic representation of a machine in the exemplary form of a computer system within which a set of instructions, for causing the machine to perform any one or more of the methods discussed herein, may be executed in one embodiment.

FIG. 7 illustrates a diagrammatic representation of a machine in the exemplary form of a computer system within which a set of instructions, for causing the machine to perform any one or more of the methods discussed herein, may be executed in one embodiment. A set of instructions for causing the computing device 700 to perform any one or more of the methods discussed herein may be executed by the computing device 700.

In one embodiment, the computing device 700 may be connected to other computing devices by a network provided by a Local Area Network (LAN), an intranet, an extranet, the Internet or any combination thereof. The computing device may operate in the capacity of a server or a client machine in a client-server network environment or as a peer machine in a peer-to-peer (or distributed) network environment. The computing device may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, a "computing device" referenced herein includes any collection of machines (e.g., computers) that individually or jointly execute a set (or multiple sets) of instructions to perform any one or more of the methodologies discussed herein.

In one embodiment, the computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.) and a data storage device 717, which communicate with each other via a bus 708.

In one embodiment, the processing device 702 represents one or more general-purpose processors such as a microprocessor, central processing unit or the like. Processing device may include any combination of one or more integrated circuits or packages that may, in turn, include one or more processors (e.g., one or more processor cores). Therefore, a processing device may be provided by a single core CPU, a multi-core CPU, or a massively multi-core system that includes many interconnected integrated circuits, each of which may include multiple processor cores. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor or the like.

In one embodiment, the computing device 700 may further include one or more network interface devices 722. The computing device 700 also may include a video display unit 77 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker).

In one embodiment, the data storage device 717 may include a computer-readable storage medium 724 on which is stored one or more sets of instructions 754 embodying any one or more of the methods or functions described herein. The instructions 754 may also reside, completely or at least partially, within the main memory 704 or within the processing device 702 during execution thereof by the computing device 700; the main memory 704 and the processing device 702 also constituting machine-readable storage media.

While the computer-readable storage medium 724 is shown as a single medium, a "computer-readable storage medium" as referenced herein includes a single medium or multiple media (e.g., a centralized or distributed database and associated caches and servers) that store the one or more sets of instructions. A "computer-readable storage medium" also includes any medium that is capable of storing, encoding or carrying a set of instructions for execution by the machine and that cause the machine to perform any one or more of the methods described herein. Examples of computer-readable storage media include, but not limited to, solid-state memories, optical media and magnetic media.

The preceding description sets forth numerous specific details such as examples of specific systems, components, methods and so forth, in order to provide a good understanding of various embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In the above description, numerous details are set forth. It will be apparent, however, to one of ordinary skill in the art having the benefit of this disclosure, that certain embodiments described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. These signals may include bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, passages utilizing terms such as "determining", "identifying", "adding", "selecting" or the like, describe the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations described herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It is to be understood that the above description is intended to be illustrative and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. A method, comprising:
   receiving, by a profiling orchestrator service, a profiling request initiated by a profiling client, the profiling request identifying a master node and a target application to be executed by the master node and a plurality of worker nodes;
   transmitting, to a profiling agent of a worker node of the plurality of worker nodes, a profiling command identifying a triggering event and a parameter reflecting execution of the target application on the worker node, wherein the triggering event specifies a method to appear on a stack trace of the worker node;
   receiving profiling data comprising an execution marker associated with execution of the target application on the worker node; and
   forwarding the profiling data to the profiling client.

2. The method of claim 1, wherein the parameter is provided by one of: a time parameter, an identifier of an execution thread of the target application, or an identifier of a transaction to be executed by the target application.

3. The method of claim 1, wherein the execution marker is provided by one of: a timestamp, an identifier of an execution thread of the target application, or an identifier of a transaction to be executed by the target application.

4. The method of claim 1, further comprising:
   querying the master node for a list of the worker nodes employed to execute the target application.

5. The method of claim 1, further comprising:
   aggregating the profiling data based on the execution markers.

6. A computer system, comprising:
   a memory; and
   a processing device coupled to the memory, the processing device to:
      receive a profiling request identifying a master node and a target application to be executed by the master node in communication with a plurality of worker nodes;
      query the master node for network connection data of profiling agents associated with the plurality of worker nodes;
      transmit, to a profiling agent of a worker node of the plurality of worker nodes, a profiling command identifying a triggering event to start profiling of the target application on the worker node, wherein the triggering event specifies a method to appear on a stack trace of the worker node;
      receive profiling data comprising a plurality of execution markers associated with execution of the target application on the worker node; and
      aggregate the profiling data based on the execution markers.

7. The computer system of claim 6, wherein the processing device is further to:
   forward the profiling data to a profiling client.

8. The computer system of claim 6, wherein the execution marker is provided by one of: a timestamp, an identifier of an execution thread of the target application, or an identifier of a transaction to be executed by the target application.

9. The computer system of claim 6, wherein the profiling command specifies at least one of: a profiling start time, a profiling stop time, a profiling sampling interval, or profiling data to be retrieved.

10. The computer system of claim 6, wherein the processing device is further to:
    scan a network to identify a plurality of profiling agents associated with the plurality of worker nodes.

11. The computer system of claim 6, wherein the processing device is further to:
    transmit, to the profiling agent, a second profiling command identifying a profiling session parameter.

12. A non-transitory computer-readable storage medium comprising executable instructions that, when executed by a processing device, cause the processing device to:
    receive a profiling request initiated by a profiling client, the profiling request identifying a master node and a target application to be executed by the master node and a plurality of worker nodes;
    transmit, to profiling agent of a worker node of the plurality of worker nodes, a profiling command identifying a triggering event and a parameter reflecting execution of a target application of the target application on the worker node;
    receive profiling data comprising a plurality of execution markers associated with execution of the target application on the worker node, wherein the triggering event specifies a method to appear on a stack trace of the worker node; and
    aggregate the profiling data based on the execution markers.

13. The non-transitory computer-readable storage medium of claim 12, further comprising executable instructions to cause the processing device to:
    forward the profiling data to the profiling client.

14. The non-transitory computer-readable storage medium of claim 12, wherein the parameter is provided by one of: a time parameter, an identifier of an execution thread of the target application, or an identifier of a transaction to be executed by the target application.

15. The non-transitory computer-readable storage medium of claim 12, wherein the execution marker is provided by one of: a timestamp, an identifier of an execution thread, an identifier of a transaction to be executed by the target application.

* * * * *